United States Patent

[11] 3,544,771

[72] Inventor Thomas R. O'Meara
Malibu, California

[21] Appl. No. 607,007
[22] Filed Jan. 3, 1967
[45] Patented Dec. 1, 1970
[73] Assignee Hughes Aircraft Company
Culver City, California
a corporation of Delaware

[54] RECORD MEDIUM HAVING CHARACTER REPRESENTATIONS THEREON
9 Claims, 9 Drawing Figs.

[52] U.S. Cl. .................................................... 235/61.12; 340/146.3
[51] Int. Cl. .................................................... G06r 19/06
[50] Field of Search .................................................... 340/146.3 (Font digest, RR car digest), 235/61.12; 346/74)MP); 178/6.6(A); 283/(Inquired); 35/(Inquired)

[56] References Cited

UNITED STATES PATENTS

| | | | |
|---|---|---|---|
| 3,426,324 | 2/1969 | Manly ........................ | 340/146.3 |
| 3,309,711 | 4/1967 | Sorrells et al. ................ | 346/74(MP) |
| 3,259,884 | 7/1966 | Holt ........................ | 340/146.3 |
| 3,166,743 | 1/1965 | Greenwald .................. | 340/146.3 |
| 3,145,291 | 8/1964 | Brainerd ..................... | 340/146.3XX |
| 2,963,220 | 12/1960 | Kosten et al. ................ | 235/61.12 |
| 1,997,157 | 4/1935 | Tauschek .................... | 235/61.12 |
| D. 16,643 | 4/1886 | Ruthven ...................... | 340/146.3 |

*Primary Examiner*—Thomas A. Robinson
*Attorneys*—James K. Haskell and Robert Thompson

ABSTRACT: An information bearing medium processed to produce three levels of output signals when machine read, and an apparatus for reading the medium.

INVENTOR.
THOMAS R. O'MEARA
BY
Robert Thompson
ATTORNEY.

| | A | B | C | D | E | F | G | H | I | J | K | L | M | N | O | P | Q | R | S | T | U | V | W | X | Y | Z | |
|---|---|---|---|---|---|---|---|---|---|---|---|---|---|---|---|---|---|---|---|---|---|---|---|---|---|---|---|
| A | 20 | 4 | 4 | 2 | -6 | -4 | 6 | 0 | 0 | -2 | -4 | -2 | 2 | -4 | 2 | -6 | -6 | 0 | -6 | -2 | -2 | -4 | 0 | -4 | -6 | -4 | A |
| B | | 20 | 0 | -4 | 2 | -2 | 8 | 0 | -4 | 8 | 6 | -6 | 0 | 2 | 4 | 2 | 2 | 8 | 6 | 0 | 0 | -2 | 0 | -6 | -2 | -6 | B |
| C | | | 20 | -4 | 0 | 2 | 7 | 0 | -2 | -2 | 8 | 4 | 0 | 0 | 7 | 6 | 3 | -2 | 2 | -2 | -1 | -2 | -1 | -2 | 2 | 2 | C |
| D | | | | 20 | -8 | 2 | -8 | 4 | 2 | -6 | -10 | 8 | -5 | -2 | 2 | 2 | -4 | -6 | -4 | 6 | -1 | 6 | -1 | 4 | 4 | -2 | D |
| E | | | | | 20 | 0 | 4 | 6 | -2 | 6 | 6 | -2 | 0 | 0 | 6 | -2 | 0 | 8 | 6 | -6 | 2 | -6 | -2 | 0 | -2 | 6 | E |
| F | | | | | | 20 | 0 | -4 | -6 | 2 | -2 | -2 | 2 | -6 | 2 | 0 | 0 | -4 | 2 | 6 | 2 | -2 | -4 | 0 | 4 | 4 | F |
| G | | | | | | | 20 | 4 | -6 | 2 | 6 | -2 | 0 | -4 | 6 | 6 | 4 | 8 | 6 | -4 | -2 | 2 | 0 | 2 | -6 | 0 | G |
| H | | | | | | | | 20 | 0 | 2 | 8 | -6 | 8 | 6 | -2 | 8 | 6 | 8 | 4 | -6 | 4 | 0 | 4 | 4 | -2 | 2 | H |
| I | | | | | | | | | 20 | 4 | -4 | -4 | 0 | 0 | 0 | 0 | 4 | -2 | 0 | -8 | 0 | 0 | 0 | 0 | 0 | 0 | I |
| J | | | | | | | | | | 20 | 0 | -6 | -6 | 2 | -6 | -4 | -6 | 2 | -2 | -4 | 0 | -4 | -6 | 2 | 4 | 8 | J |
| K | | | | | | | | | | | 20 | -8 | 4 | 8 | -6 | 2 | 0 | 6 | 0 | -4 | 0 | -4 | 0 | 8 | 0 | 0 | K |
| L | | | | | | | | | | | | 20 | -8 | -6 | 0 | -8 | -8 | -6 | 6 | 8 | -2 | 0 | -2 | 0 | 4 | 4 | L |
| M | | | | | | | | | | | | | 20 | 6 | 6 | 6 | 6 | 0 | 2 | 2 | 2 | -4 | 2 | -4 | -2 | -6 | M |
| N | | | | | | | | | | | | | | 20 | 0 | 2 | 2 | 2 | -2 | -4 | -2 | 4 | 4 | 6 | 2 | -6 | N |
| O | | | | | | | | | | | | | | | 20 | 6 | 4 | -2 | 6 | -2 | 2 | 2 | 6 | -6 | -4 | -6 | O |
| P | | | | | | | | | | | | | | | | 20 | 8 | 6 | -2 | -4 | 2 | 2 | 2 | 2 | -2 | 4 | P |
| Q | | | | | | | | | | | | | | | | | 20 | 4 | 2 | -4 | 4 | 4 | 6 | -4 | -8 | -3 | Q |
| R | | | | | | | | | | | | | | | | | | 20 | 6 | -2 | -4 | 0 | 0 | 2 | -8 | 0 | R |
| S | | | | | | | | | | | | | | | | | | | 20 | 0 | 4 | -2 | 0 | -4 | 2 | 2 | S |
| T | | | | | | | | | | | | | | | | | | | | 20 | -2 | 6 | 6 | -2 | 2 | 2 | T |
| U | | | | | | | | | | | | | | | | | | | | | 20 | 4 | -6 | 2 | 2 | -4 | U |
| V | | | | | | | | | | | | | | | | | | | | | | 20 | 2 | -4 | -2 | -8 | V |
| W | | | | | | | | | | | | | | | | | | | | | | | 20 | -4 | -2 | -6 | W |
| X | | | | | | | | | | | | | | | | | | | | | | | | 20 | 6 | 6 | X |
| Y | | | | | | | | | | | | | | | | | | | | | | | | | 20 | 8 | Y |
| Z | | | | | | | | | | | | | | | | | | | | | | | | | | 20 | Z |

FIG. 4a.

| | 0 | 1 | 2 | 3 | 4 | 5 | 6 | 7 | 8 | 9 |
|---|---|---|---|---|---|---|---|---|---|---|
| 0 | 20 | -4 | 1 | 0 | 0 | 2 | 0 | -7 | 0 | -6 |
| 1 | | 20 | 6 | 1 | 2 | 0 | 4 | 1 | 4 | 6 |
| 2 | | | 20 | 6 | -2 | -1 | -1 | 0 | 3 | -3 |
| 3 | | | | 20 | -7 | 7 | 5 | 0 | 5 | -1 |
| 4 | | | | | 20 | -8 | 2 | -1 | -2 | -6 |
| 5 | | | | | | 20 | 2 | -2 | 6 | 6 |
| 6 | | | | | | | 20 | -7 | 4 | -6 |
| 7 | | | | | | | | 20 | 1 | 7 |
| 8 | | | | | | | | | 20 | 2 |
| 9 | | | | | | | | | | 20 |

FIG. 4b.

RECORD MEDIUM HAVING CHARACTER REPRESENTATIONS THEREON

Yet another object is to provide improvements in character recognition, characterized by a medium processed to include a highly distinguishable set of information characters.

This invention relates generally to information processing and more particularly to character recognition.

In the field of information processing, it is sometimes difficult to distinguish between different symbols—especially when the information is machine read. For example, with conventional alphabetical characters, there is a high degree of graphical similarity between certain characters such as O and Q. In addition there is a lack of balance in the amount of area required to graphically illustrate different characters such as I and M. Consequently, machine errors, missing pieces of character, and background noise can affect the accuracy of machine reading.

Accordingly, it is an object of this invention to provide improved means and methods for overcoming the above stated limitations.

Another object of this invention is to provide improvements in recognizing and reading information characters.

Yet another object is to provide improvements in character recognition, characterized by a medium processed to include a highly distinguishable set of information characters.

Still another object is to provide an apparatus which is operable to provide a high degree of distinguishability between information characters.

Another object is to provide improvements in methods for recording highly distinguishable characters.

Other objects can be attained by providing an information-bearing medium which is processed to provide three levels of output signals. The background area of the medium is processed so that, when subjected to externally applied energy, an output signal of a first level is produced. Information areas contained within the background area can be rectangular in form and can be thought of as further divided up into a mosaic, and are processed so that when subjected to the externally applied energy, an output signal of a second level is produced. A portion of the area within each information area is processed to define a character area which is distinguishable to the human sight process and which, when subjected to the externally applied energy, causes an output signal of a third level to be produced. The characters all require substantially the same amount of area and as a result are self-normalizing. And for greater flexibility in arranging the elemental areas of the character, the character area and the residual information area are about equally balanced. The produced three levels of signal for each character are greatly dissimilar from the corresponding three levels of output signals of any other character.

The apparatus for applying energy to the information-bearing medium can, for example, be of the type which directs a beam of radiation, magnetic force, or electrical current to the medium and which detects the effect of the three distinct areas on the applied energy. Several techniques for applying the energy to the medium are by a raster scan or by a parallel scan in a plurality of rows, thereby providing three levels of signal on a fixed time base or else by an optical correlation.

Other objects, features, and advantages of this invention will become apparent upon reading the following detailed description of the several embodiments, and referring to the accompanying drawings, in which:

FIG. 1*a* is a chart schematically showing a block letter alphabet and block letter numerals processed onto a medium to produce three-level output signals when machine read;

FIG. 1*b* is a portion of the block letter alphabet and numerals of FIG. 1*a*, processed in conventional form;

Figure 1B:
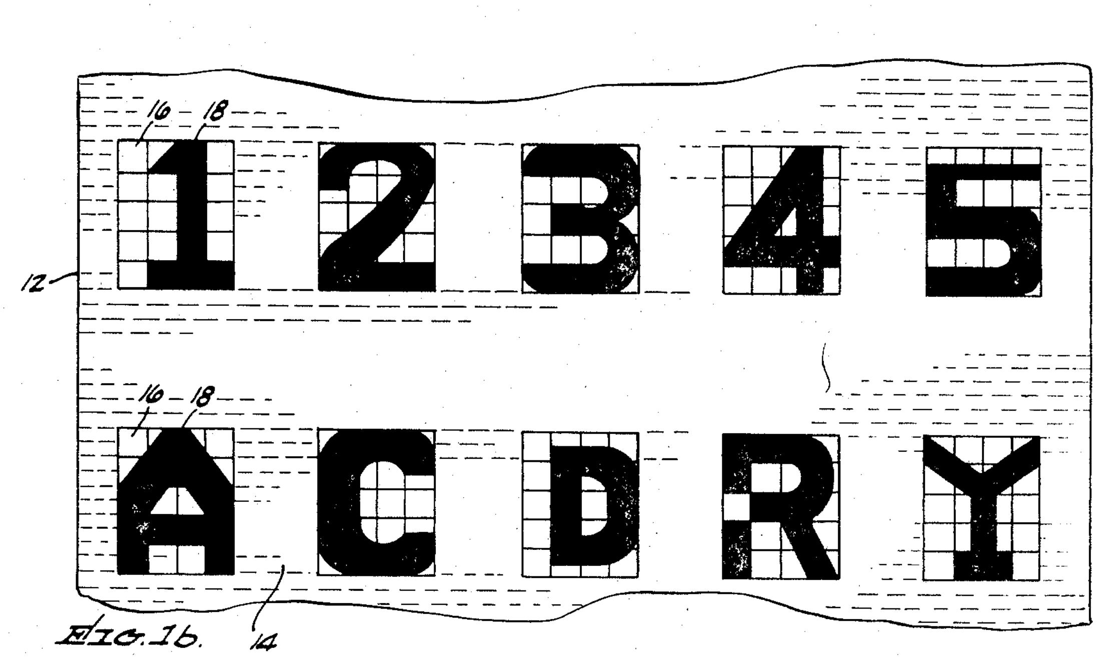
Figure 1A:
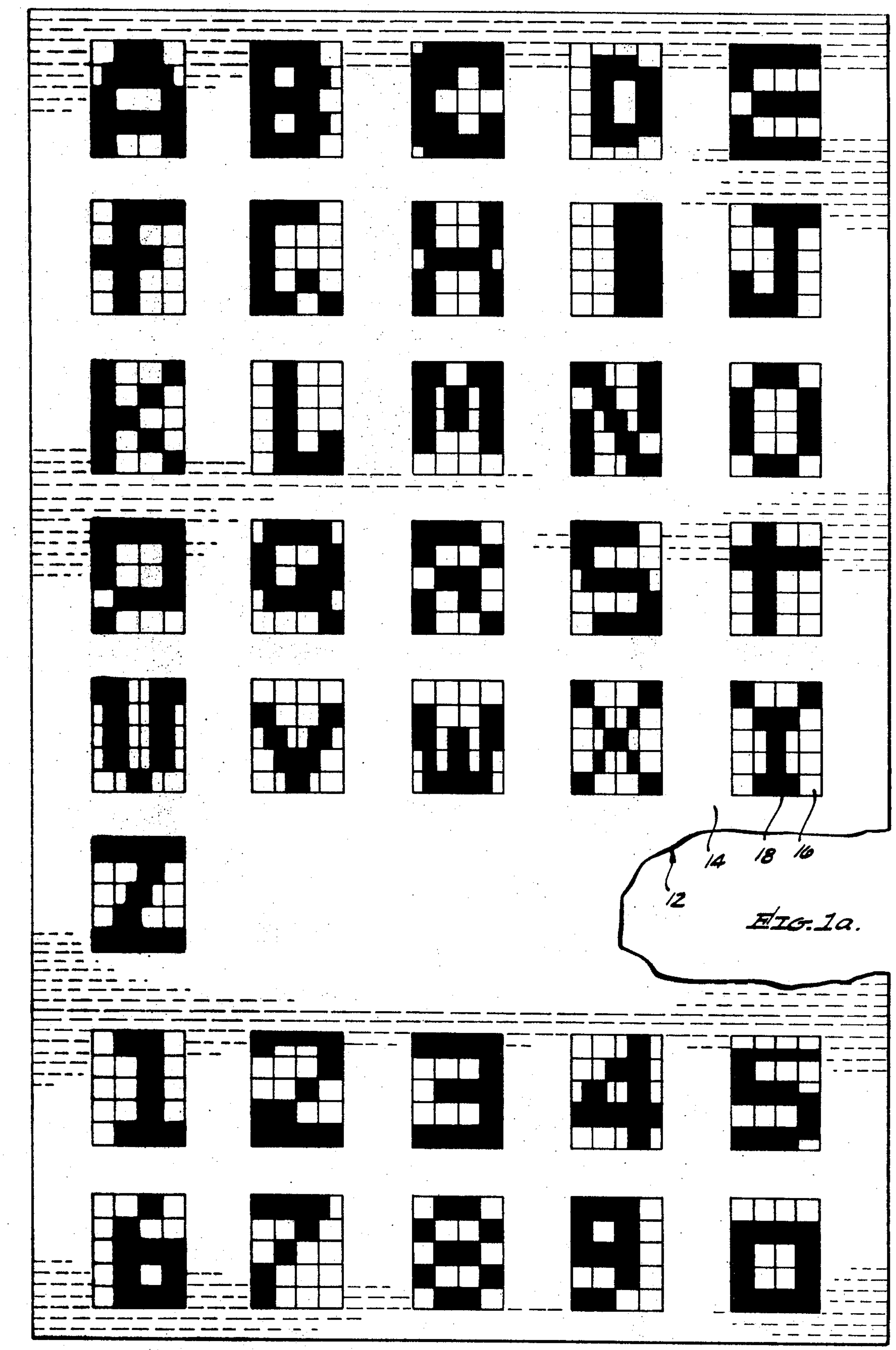
Figure 7:
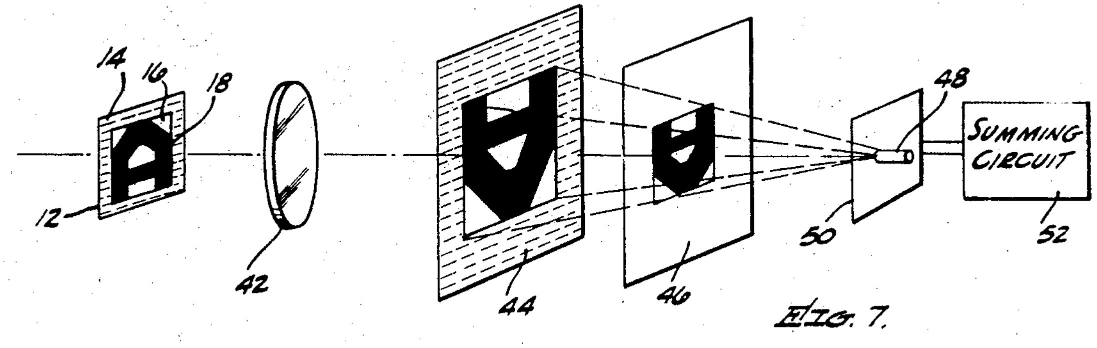
Figure 6:
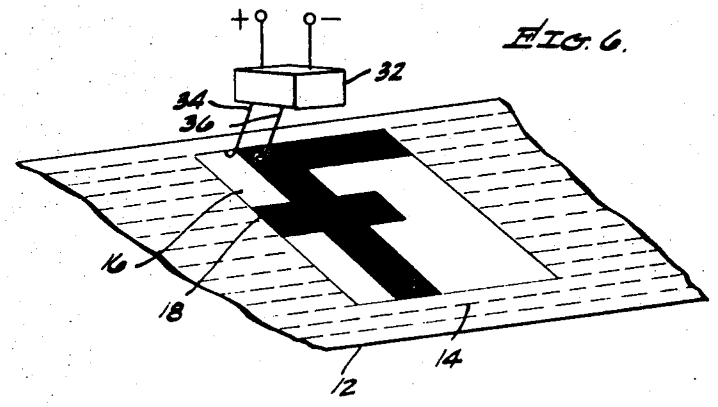
Figure 5:
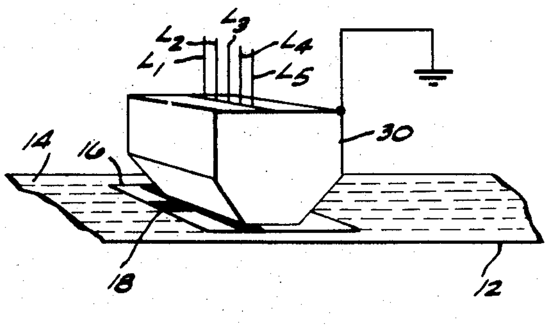

FIG. 4*a* is a cross-correlation chart for the alphabetic characters of FIG. 1*a*;

FIG. 4*b* is a cross-correlation chart for the numerals of FIG. 1*a*;

FIG. 5 is a schematic illustration of magnetic circuit for machine reading the characters;

FIG. 6 is a schematic representation of a means for electrically reading the characters with electrical current; and FIG. 7 is a schematic diagram of an optical correlator which uses complementary colors for the character as written on a dark medium.

Referring now to particular embodiments, reference is made to the information-bearing medium 12 illustrated in FIGS. 1*a* and 1*b*. The medium 12 is illustrated schematically as having been processed to provide highly distinguishable information portions, each containing an alphabetic character or numeral which is readable by man and by machine.

The alphabet and numerals illustrated in FIG. 1*a* are in block form. Generally, the characters are formed by dividing the rectangular areas into a 4 × 5 mosaic of 20 square mosaic elements. The area required for each of the characters is substantially equal throughout the entire alphabet and numerals. Consequently, the characters are self-normalized and have the advantage of eliminating the normalization step in machine character recognition. In addition, the amount of area required to graphically depict a character and the resulting residual information area is substantially equally balanced. In the particular block letter alphabetic characters and numerals illustrated in FIG. 1*a*, approximately half of the mosaic area is processed with a first material, generally shown as white, and the remainder of the mosaic areas are processed with a second material, generally shown as black, to define a recognizable character. Half the mosaic elements are processed in a certain color, with the remainder processed in an opposite color for all characters. The background area surrounding the rectangular areas is processed with a third material, generally shown as gray. As will be explained in more detail shortly, a three-level output signal will be generated when the characters are machine-read.

It should be noted that the blocklike characters of the alphabet and numerals illustrated in FIG. 1*a* can be made more conventional by rounding the corners as illustrated by the portion of the alphabet and the numerals in FIG. 1*b*. These characters can have substantially the same area balance as those in FIG. 1*a*, and can have substantially the same correlation functions. Furthermore, the rounded approximations are more quickly recognized by a human observer. The use of half-mosaics and quarter-mosaics will render the characters more conventional and reduce the cross-correlation values somewhat. It should, of course, be understood that in normal operating conditions, the characters would be ordered in other sequences such as words rather than in alphabetical order and numerical order as shown in FIGS. 1*a* and 1*b*.

Structurally, the medium 12 is of some material which can be processed to provide three levels of signals when subjected to energy. For example, for documents, one type of material could be paper which is opaque, translucent, or in special circumstances, transparent. Another material that might be used is metal, where for example, the characters are on a license plate. It should, of course, be understood that many other materials can be used for the medium 12, and it is only necessary that the material be capable of being processed to produce the three levels of signal when energy is applied thereto.

Preferably, the material of the medium is processed in the following arrangement. The background area 14 typically comprises the main surface area of the medium 12 and is processed so that when energy is applied to incremental areas thereof, the applied energy is affected so that an output signal having a first level of response is produced.

A plurality of rectangular information areas 16 are contained within the background area. Preferably, these information areas 16 are each rectangular and of the same dimensions. For purposes of description and illustration, each information area 16 can be thought of as being further divided into a mosaic which, in the illustrated embodiment, contains 20 smaller squares. The residual information area, left after a character area 18 is processed, is in turn processed so that when energy is applied to incremental areas thereof, the applied energy is affected so that an output signal of a second level is produced.

A character area 18 is delineated within the information area 16 by selectively processing the smaller mosaic areas in a manner which provides reasonably conventional alphabetic characters and numerals, yet characters which are modified in certain ways such that they provide enhanced distinguishability features and advantages which will be explained in more detail shortly. When the processed character areas 18 have energy applied to them, the applied energy is affected so that a signal having a third output level is produced.

The output signal associated with the background area is at an intermediate level, and levels of the output signals associated with the information area 16 and the character area 18 are above and below the intermediate level respectively, by about equal amounts. It should, of course, be noted that the levels of the output signals associated with the different areas could be interchanged or reversed.

There are numerous ways in which the background area 14, the information areas 16, and the character areas 18 may be processed to attain the desired advantages. For example, the shading or color of the areas may be complementary. One such arrangement would be to process the medium with a dye, stain, or ink such that the background area 14 is gray, the residual information area 16 is white, and the character area 18 is black.

Thus, when energy in the form of electromagnetic radiation, such as light, is directed to the medium 12 in a raster scan pattern, a unique, highly distinguishable series of three-level pulse signals is generated for each reference character. For example, as illustrated in FIG. 2, when the character F is scanned in the horizontal raster scan pattern on a line-by-line basis, a three-level output pulse signal (FIG. 3) is generated which is readily distinguishable from a three-level output pulse signal generated when any other character or numeral is scanned.

Figure 2:
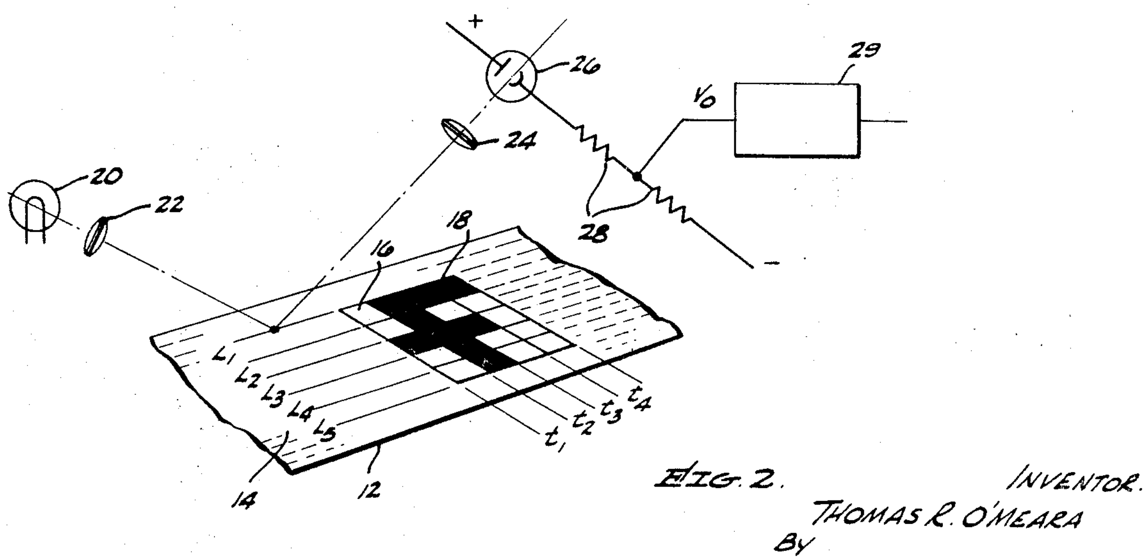
FIG. 2 is a schematic diagram of an optical scanning apparatus which utilizes reflected energy.

Referring now to the detailed operation of the optical reading apparatus illustrated in FIG. 2, radiation from a lamp 20 is directed through a lens 22 and is focused upon a small incremental area or spot on the surface of the information-bearing medium 12. As the medium 12 is moved in the direction of the arrow relative to the detector apparatus, the area of focused radiation scans the material within the bounds of horizontal strips or lines $L_1$ through $L_5$. Thus, while the spot of focused radiation is scanning the gray background area 14, a portion of the radiation is reflected from the gray material and directed to a lens 24 and focused in a photodetector 26. The intermediate amount of reflected radiation causes a decrease in the resistance between the plate and the cathode of the photo detector 26, thereby causing the voltage level $V_o$ at the tap point of voltage divider 28 to stabilize an intermediate voltage level or first voltage level.

Figure 3:
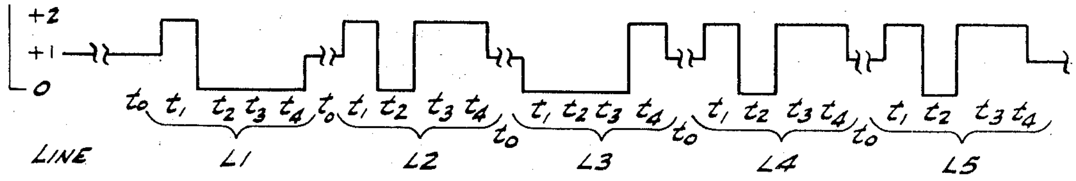
FIG. 3 is a graphical waveform of pulses generated when the character F is scanned by the optical scanning apparatus of FIG. 2.

This voltage level is illustrated graphically as the +1-volt signal in FIG. 3 generated during the time intervals $t_o$.

As the spot of focused radiation scans along the horizontal line $L_1$, it will eventually be focused upon the information area 16, which is white. Consequently, the amount of radiation reflected through the lens 24 to the photodetector 26 increases, thereby further decreasing the resistance across the plate and cathode of photodetector 26. This decrease in the photodetector resistance results in an increase in the level of the output voltage $V_o$ developed at the tap point of voltage divider 28. The time period $t_1$ that the spot scans the first mosaic area in the first line $L_1$ is represented by the +2-volt pulse signal illustrated in FIG. 3.

As the radiation spot continues to scan the surface of the information-bearing medium 12, it is focused upon the dark character area 18. As a result, the amount of radiation reflected from the information-bearing medium 12 significantly decreases, thereby decreasing the amount of radiation focused upon the photodetector 26. As a result, the resistance across the photodetector 26 increases, thereby causing a drop in the voltage level of the output voltage $V_o$ developed at the tap point of voltage divider 28. This output signal is represented by the voltage pulse waveform having a 0-volt amplitude during the time intervals $t_2$ through $t_4$.

Thereafter, during time period $t_o$, the radiation spot is focused upon the background area 14 and again causes the output signal $V_o$ to rise to the intermediate level in the manner previously described.

Similarly, for the second horizontal raster scan line $L_2$, the focused spot of energy again scans the background area 14, the information area 16, and the character area 18 during the time period $t_o$ through $t_4$ and results in the generation of the three-level output pulses corresponding to the second line $L_2$.

Output signals, corresponding to horizontal scan lines $L_3$ through $L_5$, are also generated in this same manner.

Of course, it should be understood that the horizontal scan lines $L_1$ through $L_5$ could be scanned simultaneously by means of a parallel set of lamps 20, lenses 22 and 24, and photodetectors 26, in which the individual sets are associated with an individual line.

These pulses are fed to a correlator 29 where they are compared with sets of pulses associated with each of the characters to be read.

With the three levels of output signals, the letter F is highly distinguishable from all other characters to the degree indicated in the cross-correlation charts of FIG. 4*a* and 4*b*. For example, there are a total of 20 positive and negative pulses associated with the character F. Thus, whenever the pulses generated when the letter F is read are compared with the reference pulses for the letter F, there should be 20 coincidences with one another.

Conversely, if the pulses generated when the other characters A through Z are read and are compared with the reference pulses for the character F, there will be a low degree of correlation and a high degree of distinguishability as indicated by the total number of coincidences minus the number of noncoincidences occurring therebetween, assuming a square-by-square comparison. For example, as indicated in the cross-correlation chart of FIG. 4*a*, when the pulses associated with the character Q are compared with the reference pulses associated with the character F, there will be four coincidences more than noncoincidences. It should be noted that for all characters, A through Z, there is also a high degree of distinguishability between one another, as indicated by the cross-correlation numbers relative to 20. It should, of course, be understood that another resolution other than 4 horizontal lines by 5 vertical lines could be used, whereupon a number other than 20 would result.

Another technique of scanning the characters would be to focus the characters on the face of a cathode ray tube and to scan the characters with an electron beam.

Still other forms of energy could be applied to the medium 12 in different manners. For example, nonvisible radiation (such as infrared radiation) magnetic energy, or electrical current could be applied. And the energy could be either reflected from the surface of the medium 12 or could be transmitted through the medium if the material is sufficiently transmissive.

With magnetic energy, the medium 12 is processed so that the background area 14, the information area 16, and the character area 18 are of a magnetically responsive material. For example, the background area 14 might be coated with an intermediate thickness of magnetic material. The information area 16 might be coated with another thickness of material. And the character area 18 might be coated with a third thickness of magnetic material. The character area 18 would also contain some coloring material which would make the character readily distinguishable to the eye. Of course, the different areas of the medium 12 could be coated with magnetic materials having a different polarity or different grain orientation, which could be preprocessed during a deposition preparation or the like.

To machine-read the magnetic material, an apparatus of the type illustrated in FIG. 5 including a magnetic head 30 and having one or more tracks, would be moved relative to the medium 12 in a conventional scan pattern. The particular magnetic head 30, illustrated in FIG. 5 is a multitrack magnetic head 30 having at least five tracks. Each head track is associated with a particular scan line so that the output signals associated with lines $L_1$ through $L_5$ are produced in parallel as the head 30 traverses the magnetic medium 12.

For reading the characters with electrical currents, a reading head 32, such as is illustrated in FIG. 6, having a pair of closely spaced fingers 34 and 36 which are moved across the surface of medium 12, results in an electrical current being passed between the two fingers as a result of the different conductivities in the background area 14, the information area 16, and the character area 18. To attain the three levels of conductivity between the fingers 34 and 36, the background area 14 is processed such as being coated with a material having a first level of conductivity per square. The information area 16 could be processed with a material so that it would have a second level of conductivity per square. And the character area 18 is processed with a material so that it has a third level of conductivity per square. In addition, the character area 18 is processed such as by inking so that it is readily visible to the human eye. It should, of course, be understood that there are many other possible ways that energy could be applied to the medium 12 by electromagnetic means or by electronic means.

In an optical correlator system illustrated in FIG. 7, the medium 12 has the characters recorded thereon in complementary colors. For example, the character area 18 could be red, the information area 16 green, and the background area 14 of some color such as black.

In operation, an image of the character is focused through a lens 42 to a ground glass screen 44. The image of the character on the screen 44 serves as a self-luminous source or input for a noncoherent optical correlator.

The light from the screen 44 is directed through sets of reference transparencies 46 to a photodetector 48 associated with a correlation output plane 50. The reference transparencies 46 include a pair of transparencies for each character to be read. One of these reference transparencies is a positive transparency where the character area is red and the information area 16 is green. The other transparency is a negative transparency in which the colors are reversed; in other words, the character area 18 is green and the information area is red.

The photodetector 48 detects the optical intensity level $I_{de}$ of the light which is focused through the character transparency 46 in accordance with the function $$I_{de}=\iint S_o(x,y)\,R_o(x,y)\,d_x d_y$$

where $I_{de}$ = optical intensity at the photo detector input;
$S_o$ = character illumination optical intensity;
$R_o$ = reference character optical transmission.

For example, when the positive character transparency 46 associated with the character A is positioned between the ground glass screen 44 and the output plane 50, the intensity of the optical light detected by the photodetector 48 is a positive value or number. This positive number is fed to a summing circuit 52 which stores the signal in the form of an analog number or can convert it from an analog form to a digital number. When the negative transparency 46 is positioned between the ground glass screen 44 and the correlation output plane 50, any light transmitted therethrough can be interpreted as negative correlation value or a number which is subtracted from the positive number. Thus, the photodetector 48 also detects the intensity of the negative number and transmits it to the summing circuit wherein it is subtracted from the positive number.

The sum of the two numbers provides an output number which, as indicated in the cross-correlation chart of FIG. 4, provides a high degree of correlation for the different characters. Thus, in effect, the three-level characters are highly distinguishable from one another when correlated.

While the salient features have been illustrated and described with respect to several embodiments, it should be readily apparent that modifications can be made within the spirit and scope of the invention, and it is therefore not desired to limit the invention to the exact details shown and described.

I claim:

1. An information character bearing device adapted to be visually read or machine read by energy applied thereto, comprising: a medium divided into three portions, a first one of said portions including a material operable to provide a first level of response to the applied energy, a plurality of second ones of said portions including a material operable to provide a second level of response to the applied energy, and individual third ones of said portions each within the boundaries of one of the second ones of said portions including a material within boundaries defining individual characters, each character having generally balanced low degrees of cross-correlation between coincidences of elemental areas relative to all different ones of the characters and being operable to provide a third level of response to the applied energy, the area within the boundaries of each character and the residual areas of the second ones of said portions outside the boundaries of the character being about equal.

2. The device of claim 1 in which the second said portion is a parallelogram.

3. The device of claim 1 in which the second one of said portions is bounded on all sides by the first one of said portions and the third one of said portions is bounded within the second one of said portions.

4. The device of claim 3 in which the second one of said portions is rectangular.

5. The device of claim 4 in which the second one of said portions is bounded on all sides by the first one of said portions and the third one of said portions is bounded within the second one of said portions.

6. The device of claim 5 in which the second said portions are all substantially the same size and same spacing from each other.

7. The combination of claim 1 in which the first level of response has a value intermediate of the corresponding values of the second level of response and the third level of response.

8. The combination of claim 1 in which the amplitude of the first level of response is intermediate of the amplitude of the second level of response and the amplitude of the third level of response.

9. The combination of claim 6 in which the first level of response has a uniform value intermediate of the corresponding uniform values of the second level of response and the third level of response.